United States Patent
Felteau

(10) Patent No.: US 12,538,263 B2
(45) Date of Patent: *Jan. 27, 2026

(54) SYSTEMS AND METHODS FOR DETERMINING PROXIMITY OF ARCHITECTURAL STRUCTURE COVERINGS

(71) Applicant: Hunter Douglas Inc., New York, NY (US)

(72) Inventor: Wesley Felteau, Golden, CO (US)

(73) Assignee: Hunter Douglas Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/737,432

(22) Filed: Jun. 7, 2024

(65) Prior Publication Data

US 2024/0334388 A1    Oct. 3, 2024

Related U.S. Application Data

(63) Continuation of application No. 18/324,655, filed on May 26, 2023, now Pat. No. 12,047,905, which is a
(Continued)

(51) Int. Cl.
*H04W 64/00* (2009.01)
*G06F 3/04847* (2022.01)
(Continued)

(52) U.S. Cl.
CPC ...... *H04W 64/006* (2013.01); *G06F 3/04847* (2013.01); *H04B 17/318* (2015.01); *H04W 64/003* (2013.01); *H04W 72/30* (2023.01)

(58) Field of Classification Search
CPC .... G05B 2219/2642; G05B 2219/2653; G05B 2219/45015; H04L 12/2803; E06B 9/68; E06B 2009/6818; E06B 9/40
See application file for complete search history.

(56) References Cited

U.S. PATENT DOCUMENTS

| 11,696,252 B2 | 7/2023 | Felteau |
| 12,047,905 B2 | 7/2024 | Felteau |
| (Continued) |

FOREIGN PATENT DOCUMENTS

| CN | 101160444 A | 4/2008 |
| CN | 109577843 A | 4/2019 |
| (Continued) |

OTHER PUBLICATIONS

Extended European Search Report mailed Feb. 9, 2021 in European Patent Application No. 20195766.9, 8 pages.
(Continued)

*Primary Examiner* — Khalid W Shaheed
(74) *Attorney, Agent, or Firm* — Dority & Manning, P.A.

(57) ABSTRACT

Techniques including transmitting a first signal to a plurality of architectural structure coverings, wherein a first architectural structure covering of the plurality of architectural structure coverings includes a mechanically movable material. The techniques further including receiving, from the first architectural structure covering, a second signal indicating a proximity of the first architectural structure covering. The techniques further including maintaining an ordered list of the plurality of the architectural structure coverings based on the second signal. The techniques further including displaying at least a portion of the ordered list on a display of the device, the portion indicating the first architectural structure covering in an order that is based on at least one of: architectural structure covering proximities, architectural structure covering types, or architectural structure covering installation areas.

20 Claims, 10 Drawing Sheets

Related U.S. Application Data continuation of application No. 17/014,812, filed on Sep. 8, 2020, now Pat. No. 11,696,252.

(60) Provisional application No. 62/900,056, filed on Sep. 13, 2019.

(51) Int. Cl.
*H04B 17/318* (2015.01)
*H04W 72/30* (2023.01)

(56) References Cited

U.S. PATENT DOCUMENTS

| | | | |
|---|---|---|---|
| 2010/0087958 A1* | 4/2010 | Mullet | G05B 19/0421 |
| | | | 700/275 |
| 2011/0240232 A1 | 10/2011 | Kluck | |
| 2014/0192061 A1 | 7/2014 | Payne et al. | |
| 2014/0267196 A1 | 9/2014 | Villarreal et al. | |
| 2014/0267331 A1 | 9/2014 | Villarreal et al. | |
| 2015/0234945 A1 | 8/2015 | Marceau et al. | |
| 2016/0054023 A1* | 2/2016 | Baker | F24F 11/30 |
| | | | 315/307 |
| 2016/0055422 A1* | 2/2016 | Li | G05B 15/02 |
| | | | 706/12 |
| 2016/0258209 A1* | 9/2016 | Berman | H05B 47/105 |
| 2017/0026831 A1 | 1/2017 | Jung et al. | |
| 2017/0123644 A1 | 5/2017 | Ren et al. | |
| 2017/0164224 A1 | 6/2017 | Min et al. | |
| 2018/0217621 A1 | 8/2018 | Biesterveld et al. | |
| 2019/0119978 A1* | 4/2019 | Hall | H04L 12/2818 |
| 2020/0259237 A1 | 8/2020 | Shrivastava et al. | |
| 2021/0063836 A1 | 3/2021 | Patterson et al. | |
| 2021/0384764 A1 | 12/2021 | Shrivastava et al. | |
| 2023/0300784 A1 | 9/2023 | Felteau | |

FOREIGN PATENT DOCUMENTS

| | | |
|---|---|---|
| CN | 106661918 B | 8/2019 |
| CN | 107294793 B | 4/2021 |
| CN | 108836093 B | 4/2021 |
| EP | 3457670 A1 | 3/2019 |
| TW | 201601127 A | 1/2016 |
| TW | 201806434 A | 2/2018 |
| TW | 201832488 A | 9/2018 |
| WO | 2014122943 A1 | 8/2014 |
| WO | 2019213441 A1 | 11/2019 |

OTHER PUBLICATIONS

U.S. Appl. No. 17/014,812, Non-Final Office Action, Mailed on Aug. 1, 2022, 16 pages.
U.S. Appl. No. 17/014,812, Notice of Allowance, Mailed on Feb. 15, 2023, 8 pages.
U.S. Appl. No. 18/324,655, Non-Final Office Action, Mailed on Dec. 21, 2023, 7 pages.
U.S. Appl. No. 18/324,655, Notice of Allowance, Mailed on Mar. 13, 2024, 11 pages.
Zafari et al., "An iBeacon based Proximity and Indoor Localization System", published on Mar. 24, 2017, arxiv.org/pdf/1703.07876, retrieved on Jun. 26, 2025, 14 pages.
Indian Office Action Corresponding to Application No. 202024038952, received on Mar. 13, 2025, 7 pages.

* cited by examiner

SYSTEMS AND METHODS FOR DETERMINING PROXIMITY OF ARCHITECTURAL STRUCTURE COVERINGS

CROSS-REFERENCE TO RELATED APPLICATION

This application is a continuation of U.S. patent application Ser. No. 18/324,655, filed on May 26, 2023, entitled "SYSTEMS AND METHODS FOR DETERMINING PROXIMITY OF ARCHITECTURAL STRUCTURE COVERINGS," now U.S. Pat. No. 12,047,905, issued Jul. 23, 2024, which is continuation of U.S. patent application Ser. No. 17/014,812, filed on Sep. 8, 2020, entitled "SYSTEMS AND METHODS FOR DETERMINING PROXIMITY OF ARCHITECTURAL STRUCTURE COVERINGS," now U.S. Pat. No. 11,696,252, issued on Jul. 4, 2023, which claims priority to U.S. Provisional Patent Application No. 62/900,056, filed on Sep. 13, 2019, entitled "SYSTEMS AND METHODS FOR DETERMINING PROXIMITY OF ARCHITECTURAL STRUCTURE COVERINGS," the contents of which is hereby incorporated by reference in its entirety for all purposes.

BACKGROUND

Architectural structure coverings, such as blinds, provide shading and privacy. Some architectural structure coverings may be manually operable (e.g., through use of a lift chord), while other architectural structure coverings may be motorized (e.g., by an electronic motor). Motorized architectural structure coverings can be operated remotely. However, in structures that have multiple architectural structure coverings, user interaction with the remotely controlled architectural structure coverings is often difficult because it is difficult to determine the target architectural structure covering.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Aspects of the present disclosure relate to architectural structure covering control based on proximity. As an example, a user device provides a user interface (UI) to process operational controls and generate control instructions for the coverings. The user device detects nearby coverings based on signal strength, and generates and/or displays an ordered list of user interface elements of the coverings for the user to operationally control. As a result, the user is able to more directly interact with the coverings and/or control the coverings without needing to move back and forth among the coverings to identify the control pairings between the user device and the coverings.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
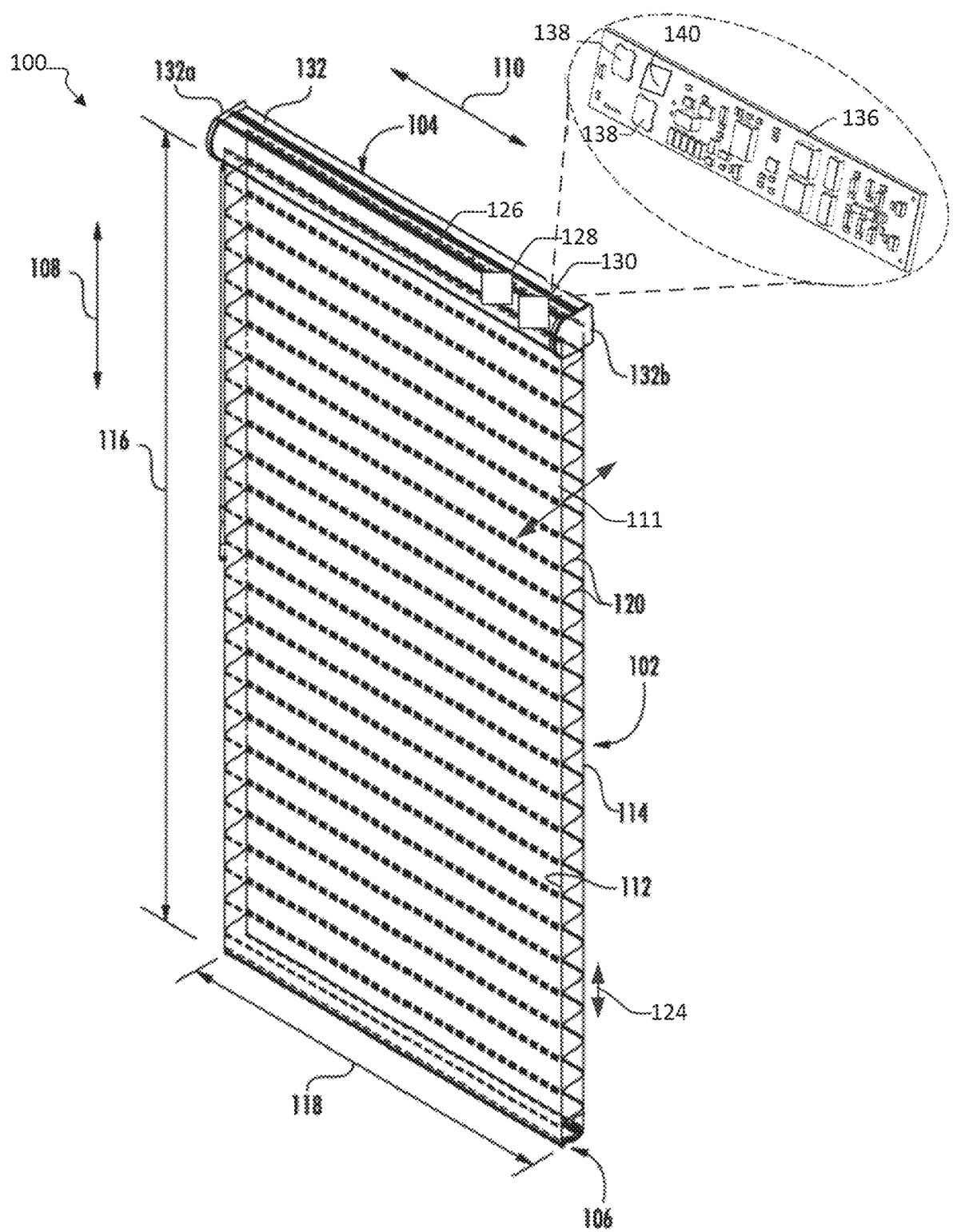
FIG. 1 is a perspective view of an exemplary architectural structure covering in an open and extended configuration.

Architectural structure coverings are typically placed over an architectural structure, for example, but not limited to, windows, doors, doorways, etc. The coverings are remotely controlled by a user device, such as, but not limited to, a mobile computing device (e.g., smartphone or remote control), a tablet computing device, a laptop computing device, or a desktop computing device, among other electronic devices. The user device provides a user interface (UI) for receiving operational control instructions from the user (e.g., extend or retract and/or open or close the covering), which causes movement control instructions to be provided to the covering and control its movement. Edifices (e.g., homes, businesses, offices, and other like buildings or structures), however, often have a large number of similar type coverings that are disposed in different areas. As such, it is difficult for a user to set up and use the remote control system because identifying locations of the control pairings between the UI and the coverings may require movement back and forth among the coverings. Accordingly, the systems and methods described herein relate to determining proximity of the architectural structure coverings to the user device. The user device then generates an ordered list based on the proximity so that the user can quickly pair the UI controls to the coverings located within the same area. As a result, the user is able to more directly interact with the coverings and/or control the coverings using techniques that were not previously available. Additionally, the overall system can be more power efficient. More specifically, by improving the identification of location pairs due to proximity and ordered list on a UI, the trial and error to control particular coverings via a user device is reduced. Accordingly, the overall amount of signaling between the coverings and the user device is reduced and, in turn, the overall power consumption is reduced. Such power efficiency is important especially in situations where the coverings and/or the user device are battery powered.

In an aspect, a system for determining proximity of a plurality of architectural structure coverings is provided. The system includes at least one processor and memory encoding computer executable instructions that, when executed by the at least one processor, perform a method. The method includes receiving a broadcast signal from each of the plurality of architectural structure coverings. Maintaining an ordered list of the plurality of the architectural structure coverings based on the broadcast signal, and displaying at least a portion of the ordered list on a display.

In another aspect, a method for determining proximity of a plurality of architectural structure coverings is provided. The method includes receiving, by a user device, a broadcast signal from each of the plurality of architectural structure coverings. The broadcast signal including informational data of the respective architectural structure covering. Generating, based on the broadcast signal, an ordered list of each of the plurality of architectural structure coverings. Then displaying the ordered list on the user device. The ordered list including a type of each of the plurality of architectural structure coverings based on the informational data received.

In yet another aspect, an architectural structure covering system is provided. The system includes a plurality of architectural structure coverings, and each of the plurality of architectural structure coverings is configured to generate a broadcast signal. A user device configured to receive the broadcast signal from each of the plurality of architectural structure coverings. Upon receipt of the broadcast signal, the user device generates, based the broadcast signal, a list of each of the plurality of architectural structure coverings. The list including a first architectural structure covering having a closer proximity to the user device being listed in relation to a second architectural structure covering having a farther proximity to the user device. The user device then displays the list on the user device.

FIG. 1 is a perspective view of an exemplary architectural structure covering 100 in an open and extended configuration. The architectural structure covering 100 includes a shade panel 102 configured to extend vertically between a roller assembly 104 and a bottom rail assembly 106. The shade panel 102 is generally configured to be moved vertically 108 relative to the roller assembly 104 between a fully lowered or extended position (e.g., as illustrated in FIG. 1) and a fully raised or retracted position (not shown). When the architectural structure covering 100 is in its retracted position, the shade panel 102 may be configured to expose an adjacent architectural structure (e.g., a window), and when the covering 100 is in its extended position, the shade panel 102 may be configured to cover the adjacent architectural structure. Additionally, the covering 100 is configured to move the shade panel 102 to any number of intermediate positions defined between the fully retracted and fully extended positions so that the shade panel 102 partially covers the adjacent architectural structure.

In the example it should be appreciated that, as used herein, the term "vertical" describes the orientation or arrangement of the architectural structure covering 100 in its extended position as indicated by arrow 108 and such as when the covering 100 is mounted for use relative to an adjacent architectural structure. Similarly, the term "horizontal" general described a direction perpendicular to vertical 108 and that extends side-to-side relative to the covering 100, as illustrated by arrow 110. Further, the term "cross-wise" generally describes a direction perpendicular to both vertical 108 and horizontal 110 and extends front-to-back relative to the covering 100, as illustrated by arrow 111. The various directional references used herein are simply utilized to provide context to the examples shown, and thus, should not be construed as otherwise limiting. For instance, some architectural structure coverings 100 may have its shade panel 102 configured to extend and retract in the horizontal direction.

In some examples, the shade panel 102 may include both a front panel 112 and a back panel 114, with the front and back panels 112, 114 being configured to be arranged generally parallel to each other in the vertical direction 108 and when the shade panel 102 is moved to its fully extended position (shown in FIG. 1). In general, the panels 112, 114 are formed from any material suitable for use within the disclosed covering 100, such as a textile, a woven and/or non-woven fabric, and/or the like. However, in some examples, one or both of the panels 112, 114 may be formed from a sheer fabric or other suitable material(s) that allows at least a portion of the light hitting the shade panel 102 to pass from one panel to the other Additionally, it should be appreciated that the front and back panels 112, 114 may generally be sized, as required or desired, to use relative to any suitable architectural structure. For example, the panels 112, 114 define a vertical height 116 and/or a horizontal width 118 sufficient to cover a window or other architectural structure. In one example, the front and back panels 112, 114 may define substantially the same height 116 and/or width 118 such that the panels 112, 114 are substantially coextensive when the shade panel 102 is in its fully extended position.

The shade panel 102 may also include a plurality of light blocking members or vanes 120 that extend between the front and back panels 112, 114, with the vanes 120 being spaced apart vertically from one another along the vertical height 116 of the shade panel 102. In some examples, each vane 120 may be configured to extend the full depth or cross-wise direction 111 between the front and back panels 112, 114. For example, each vane 120 may include a front edge coupled to the front panel 112, and a back edge coupled to the back panel 114, using any suitable means, such as stitching, sticking, adhesives, mechanical fasteners, and/or the like. Additionally, similar to the panels 112, 114, the vanes 120 may be formed from any material suitable for use within the disclosed covering 100, such as a textile, a woven and/or non-woven fabric, and/or the like. However, in some examples, the vanes 120 may be formed from a material used to form the front and back panels 112, 114. For example, each vane 120 may be formed from a light blocking or opaque material or a translucent material.

In operation, when the shade panel 102 is positioned in its fully extended position (shown in FIG. 1), the relative positioning of the front and back panels 112, 114 may be adjusted such that the vanes 120 are tilted to control the amount of light passing through the shade panel 102 as required or desired. In some examples, the shade panel 102 may be configured such that, when the front and back panels 112, 114 are moved vertically 108 relative to each other (e.g., when the back panel 114 is raised and the front panel 112 is simultaneously lowered or when the back panel 114 is lowered and the front panel 112 is simultaneously raised), the orientation or tilt angle of the vanes 120 defined between the front and back panels is adjusted. For example and as illustrated in FIG. 1, the vanes 120 are moved to a substantially horizontal position between the panels 112, 114 such that a vertical light gap 124 is defined between each adjacent pair of vanes 120 and the vanes 120 are in a fully opened configuration. In this opened position, light passes directly through the light gaps 124 defined between the vanes 120. Alternatively, the vanes 120 may be tilted to an at least partially overlapping, substantially vertical position between the panels 112, 114 such that the vanes 120 are in a fully closed configuration (not shown). In this closed position, the overlapping vanes 120 serve to prevent all or a portion of the light hitting the shade panel 102 from passing therethrough.

Additionally, the vanes 120 may be tilted to any number of intermediate tilt positions defined between the fully open and closed positions. The orientation of the vanes 120 between and including the fully open and closed configurations, can also be referred to as view through position. It should be appreciated that in one example, the vanes 120 may be spaced apart from one another and/or dimensioned such that, when moved to the fully opened position, the vanes 120 are oriented substantially horizontally 110 between the vertically hanging panels 112, 114, and when moved to the fully closed position, the shade panel 102 has a collapsed configuration in which both the vanes 120 and the panels 112, 114 hang in a substantially vertical 108 orientation.

The roller assembly 104 of the architectural structure covering 100 described above includes an operating mechanism 126 configured to support the shade panel 102 and control the extension and retraction of the shade panel 102 between its fully extended and retracted positions. In addition, the operating mechanism 126 controls the tilt of the vanes 120 between their fully opened and closed positions. In some examples, the operating mechanism 126 is covered by a valance or other suitable covering. For instance and as illustrated in FIG. 1, the roller assembly 104 may include a head rail or cover 132 and corresponding endcaps 132a, 132b configured to at least partially encase the operating mechanism 126. Moreover, various other components of the roller assembly 104 may also be configured to be housed within the head rail 132 as required or desired. In the example, the operating mechanism 126 includes a single assembly (e.g., a motor 128 and a controller 130) that drives the extension and retraction movements of the shade panel 102 and the opening and closing movements of the vanes 120. In other examples of the architectural structure covering 100, the operating mechanism 126 may have separate assemblies to drive the extension and retraction movements and the opening and closing movements, respectively.

It should be appreciated that one example of an architectural structure covering 100 is illustrated and described in FIG. 1. The architectural structure covering 100, however, may be any type of covering that at least partially covers an architectural element such as a window, a door, an opening, a wall, etc. In one example, the architectural structure covering 100 can be a sheer-type covering. In an aspect, the shade panel has sheer front and back panels that extend and retract, and a plurality of light blocking vanes extending between the panels that tilt to open and close the covering. In another aspect, the shade panel has a single sheer panel that extends and retracts, and a plurality of light blocking vanes attached to the sheer panel that open and close by sliding one end of the vane relative to the panel. In yet another aspect, the shade panel has a single sheer panel that extends and retracts, and a plurality of light blocking vanes that extend substantially vertically that rotate to open and close.

In another example, the architectural structure covering 100 can be a cellular-type covering. In an aspect, the shade panel has a front and back panel that are connected to each other in a cellular pattern (e.g., a honeycomb-type pattern, a roman covered cellular pattern, etc.) and that extend and retract in an accordion-type motion. This type of cellular pattern typically creates a layer of insulation (e.g., air) within the covering.

In yet another example, the architectural structure covering 100 can be a Roman-type covering. In an aspect, the shade panel has a single panel with a plurality of fabric folds that extend and retract via a rolling motion (e.g., rolling the folds) or a stacking motion (e.g., stacking the folds). In another aspect, the shade panel has a front and back panel connected in a cellular pattern as described above and that extend and retract. These panels include excess fabric to generate the Roman-type folds when the covering is retracted, and are not necessarily configured to move in an open and close direction.

In still another example, the architectural structure covering 100 can be a roller-type covering. In an aspect, the shade panel has a front and back panel connected in a cellular pattern as described above, but extend and retract via a rolling motion. In another aspect, the shade panel has a single panel that extends and retracts in a rolling motion. This type of single panel can be fully or partially light blocking as required or desired, and are not necessarily configured to move in an open and closed direction. In other examples, the single panel can be a UV-blocking shade. In yet another aspect, the shade panel has a front and back panel that each have alternating sheer and light blocking bands. In this example, the shade panel is extended and retracted by a rolling motion, and also open and closed by moving the panels relative to one another.

Additionally, or alternatively, the architectural structure covering 100 can be a shutter-type covering. In an aspect, the shade panel has a plurality of light blocking louvers that tilt to open and close the covering, and are not necessarily configured to move in an extended and retracted direction. The architectural structure covering 100 can be a slat-type covering. In an aspect, the shade panel has a plurality of light blocking vanes (e.g., slats) that move relative to each other to extend and retract the covering, and tilt or rotate to open and close the covering. These slat-type coverings can extend in a horizontal or vertical direction as required or desired. The architectural structure covering 100 can also be a vertical-type covering. In an aspect, the shade panel has a plurality of light blocking verticals (e.g., vanes, panels, or cellulars) that move relative to each other in a horizontal direction to extend and retract the covering, and rotate to open and close the covering. Generally, the architectural structure covering 100 can be any type of covering that is enabled to extend and retract and/or open and close as described herein.

In the example, the operating mechanism 126 is electronic and motorized so that the architectural structure covering 100 is remotely operable as required or desired. The controller 130 of the operating mechanism 126 includes one or more printed circuit boards 136 for operably controlling movement of the shade panel 102 via the motor 128. The circuit board 136 electronically communicates via wired or wireless communication with the motor 128 that drives movement of the shade panel 102 and includes the electrical components (e.g., an architectural structure covering controller such as architectural structure covering controller 142 of FIG. 2) for operating the architectural structure covering 100. The circuit board 136 and/or motor 128 may be powered by a combination of internal and/or external power line connections, battery(ies), fuel cells, solar panels, wind powered generator, and/or any other power source as required or desired. The circuit board 136 includes one or more sensors 138 so as to determine a position of the operating mechanism 126, and thus, a position of the shade panel 102 (e.g., an extended/retracted and/or open/close position). Additionally, the circuit board 136 includes a communication device 140 such as a transmitter, a receiver, a transceiver, and/or other interface to facilitate exchange of data with remote devices (e.g., user device 212 of FIGS. 3 and 4).

In operation, the architectural structure covering 100 receives operational instructions from a remote device and process and respond to the received instructions accordingly. For example, control movement of the operating mechanism 126 so as to extend or retract and/or open or close the shade panel 102 as required or desired. Furthermore, the architectural structure covering 100 generates a broadcast signal for receipt by the remote device so that the remote device can determine the type and proximity of the covering 100 as described further herein.

Figure 2:
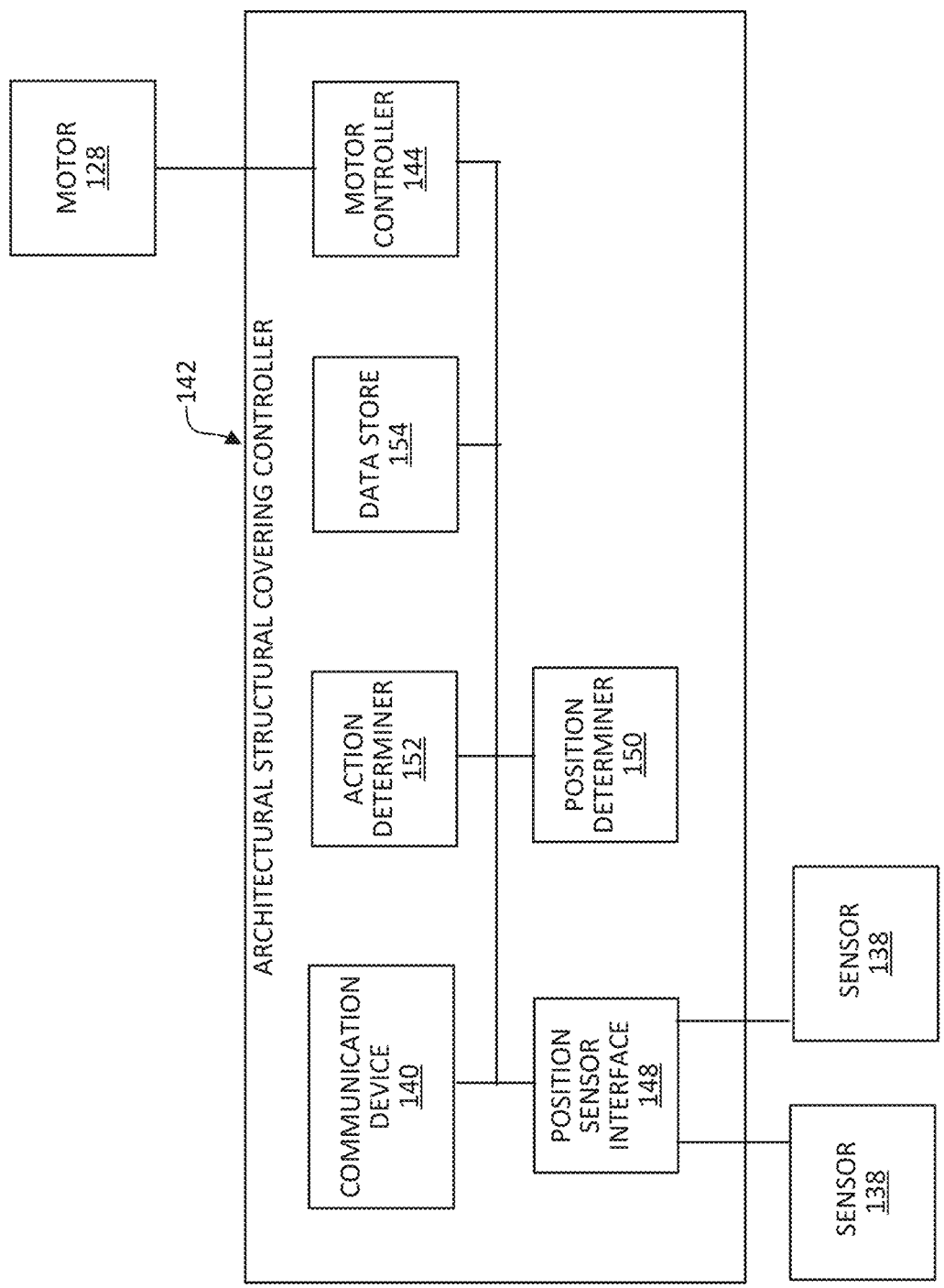
FIG. 2 is a block diagram of an exemplary architectural structure covering controller of the architectural structure covering shown in FIG. 1.

FIG. 2 is a block diagram of an exemplary architectural structure covering controller 142 of the architectural structure covering 100 (shown in FIG. 1). In the example described below, the architectural structure covering controller 142 is described in connection with the operating mechanism 126 (shown in FIG. 1), however, it is understood that the controller 142 may likewise be used to control any other component of the architectural structure covering 100 as required or desired. In some aspects, the architectural structure covering controller 142 is implemented on the circuit board 136 (shown in FIG. 1).

In the example, the architectural structure covering controller 142 includes a motor controller 144 that controls one or more motors 128 of the assembly based on one or more commands. For example, the motor controller 144 controls the direction of rotation of an output shaft of the motor 128, the speed of the output shaft, and/or other operations of the motor so as to extend and retract the shade panel 102 and/or open and close the vanes 120 (both shown in FIG. 1).

The architectural structure covering controller 142 also includes a position sensor interface 148 that receives signals from the position sensors 138. The position sensor 138 may include, for example, a magnetic encoder, a rotary encoder, a gravitational sensor, etc. The position sensor 138 may be used to count pulses or rotations of the motor 128, to track the position of a rotating element (e.g., the output shaft, the roller assembly 104 (shown in FIG. 1), etc.) while movement of the covering is being driven (e.g., by a rotating member or any other driving member). The position sensor interface 148 processes the signals from the position sensor 138 and a position determiner 150 determines a position of the architectural structure covering 100 (shown in FIG. 1) based on the processed signal(s) from the position sensor interface 148.

An action determiner 152 is used to determine what action (if any) is to be performed by the motor 128 based on input information from the communication device 140 (e.g., receiving operational instructions from a remote device) and/or the position determiner 150. In examples, the communication device is operable to communicate with remote devices via a number of different networks or protocols, such as over Wi-Fi, a cellular data network, Bluetooth, Bluetooth Low Energy, etc. For example, if an operational signal is received by the communication device 140 to open the covering, the action determiner 152 sends a signal to the motor controller 144 to activate the motor 128 in an open direction. Similarly, if an operational signal is received by the communication device 140 to close the covering, the action determiner 152 sends a signal to the motor controller 144 to activate the motor 128 in a closed direction. In another example, if an operational signal is received by the communication device 140 to extend the covering, the action determiner 152 sends a signal to the motor controller 144 to activate the motor 128 in an extended direction. Similarly, if an operational signal is received by the communication device 140 to retract the covering, the action determiner 152 sends a signal to the motor controller 144 to activate the motor 128 in a retraction direction. Based on the received operational control signal, the action determiner 152 and the position determiner 150 can selectively use the motor controller 144 to command the motor 128 in one direction or another so that the covering is moved as required or desired.

A data store 154 (e.g., memory) of the architectural structure covering controller 142 is used to store data as required or desired. For example, the data store 154 includes information that is emitted in a broadcast signal from the covering, such as, covering informational data, edifice identification number, and/or power transmission data, as described further below in reference to FIGS. 3 and 4.

Figure 3:
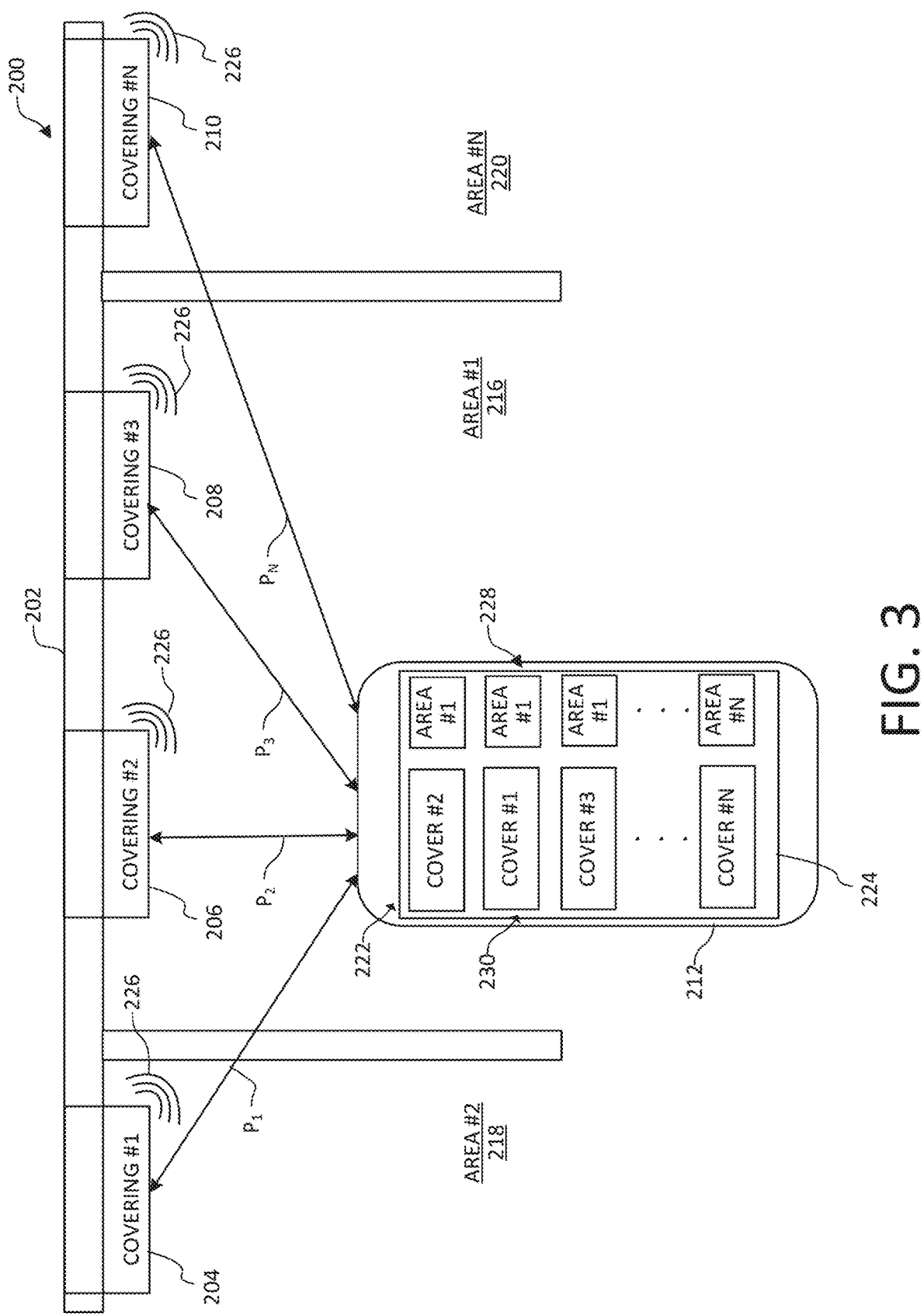
FIG. 3 is a schematic view of an exemplary architectural structure covering system in a setup configuration.

FIG. 3 is a schematic view of an exemplary architectural structure covering system 200 in a setup configuration. In the example, the system 200 includes an edifice 202 having a plurality of architectural structure coverings, for example, a first architectural structure covering 204, a second architectural structure covering 206, a third architectural structure covering 208, and an $n^{th}$ architectural structure covering 210. It should be appreciated that while only four coverings are illustrated and described, the edifice 202 may have any number of coverings as required or desired. Furthermore, the architectural structure coverings 204-210 can be all a similar type (e.g., sheer, Roman, roller, etc.) or one or more of the coverings may be a different covering type than the others. A user device 212 is coupled in communication with each of the architectural structure coverings 204-210 and used to provide operational instructions thereto. The coverings 204-210 receive instructions from the user device 212 and process and respond to the received instructions accordingly. For example, extend or retract and/or open or close the covering. In an example, the user device 212 may be a mobile computing device, a tablet computing device, a laptop computing device, or a desktop computing device, among other electronic devices including remote control devices. The user device 212 and the coverings 204-210 may communicate using any of a variety of mechanisms, including, but not limited to, infrared or other optical communication, radio or wireless communication (e.g., Wi-Fi, Bluetooth, Bluetooth Low Energy, etc.), or wired communication.

In the example illustrated in FIG. 3, the edifice 202 is separated into three areas, each containing one or more of the coverings 204-210. For example, a first area 216 includes the second and third coverings 206 and 208, a second area 218 includes the first covering 204, and an $n^{th}$ area 220 includes the $n^{th}$ covering 210. The user device 212 is mobile, and in the example, is located at least partially within the first area 216 of the edifice 202. The areas 216-220 can be rooms (e.g., bedroom(s), kitchen, dining room, etc.), offices, or any other division or selection of the edifice 202 as required or desired. Because the coverings 204-210 are remotely operable via the user device 212, a user may attempt to operate a specific covering being in a specific area (e.g., second covering 206 in first area 216), but the result is operation of another covering in a different area (e.g., first covering 204 in second area 218). This induces frustration by the user, as then the user would need to move about the edifice 202 in order to figure out the control pairings for each of the architectural structure coverings 204-210.

Accordingly, the systems and methods described herein are used to determine the proximity (e.g., distance) of each of the architectural structure coverings 204-210 from the user device 212. This enables the device 212 to generate and maintain an ordered list 222 of the coverings and display the list 222 on a display 224 (e.g., a screen) having a user interface (UI) so that the user can quickly and easily select nearby coverings for operational control thereof. In some examples, the list 222 is ordered by proximity of the covering to the user device 212. Additionally or alternatively, the list 222 is ordered by type of covering, by area, etc.

Each of the architectural structure coverings 204-210 are configured to generate (e.g., emit) a broadcast signal 226 that is received by the user device 212. Generally, a broadcast signal represents a signal that is transmitted at a predetermined interval (or rate) independently of a request from a remote device for data that the broadcast signal can indicate and without being transmitted specifically to a particular remote device. For instance, in the context of packet-based transmissions, rather than using a unicast transmission, the broadcast signal can be broadcasted as one or more packets. A broadcast of a packet includes transmitting the packet from a single source to all possible end destination within reach of a network (e.g., a WiFi network, a Bluetooth network, a Bluetooth Low Energy network, etc.). In comparison, a unicast of a packet includes transmitting the packet from the single source to a single destination. The broadcast signal 226 is generated at predetermined and/or periodic time intervals, for example, between about four and twelve emissions per second. In the example, the broadcast signal 226 includes informational data of the covering. For example, the informational data can include a name or type of the covering. In one example, the name or type of the covering can be an eight-digit code that includes a covering type (e.g., SIL for Silhouette®, PIR for Pirouette®, etc.) and the corresponding serial number or a portion thereof. Additionally or alternatively, the informational data can include a model identification number. The model identification number allows for further characteristics (e.g., operational, functional, structural, etc.) of the type of covering to be determined, such as, but not limited to, a horizontal covering, a vertical covering, tilt functionality, vane position, view through control, left and right directional extension/retraction, etc. Generally, the informational data enables the user device 212 to determine the type and model of covering and display the information to the user on the UI.

In one example, the user device 212 locally stores a database (e.g., data store or memory 1004 in FIG. 10) containing types and models of a manufacture's coverings, and use the informational data provided by the signal 226 to pull and display names 230 of the coverings within the UI. The user device 212 is also able to connect to a remote server (not shown) so as to receive updates to the database and/or the UI. For example, the remote server is operated by the covering manufacture. In another example, the user device 212 is used to push updates to the coverings 204-210 via the remote server as required or desired.

The broadcast signal 226 also includes an edifice identification number. The edifice identification number can be a unique number or hash that is associated with the edifice 202 so that the coverings 204-210 are all be linked together. This restricts coverings from a neighboring edifice (e.g., a neighbor's house) from being included within the list 222 on the user device 212 (e.g., via a filtering process). The edifice identification number may also be used for security within the system 200 as required or desired (e.g., via an authentication process). The broadcast signal 226 further includes transmit power data of the signal. For example, the first and $n^{th}$ coverings 204, 210 are positioned more towards the exterior of the edifice 202 and as such, the emitted broadcast signal 226 has its power increased so that the signal can be transmitted and received throughout the edifice 202. For example, the transmit power data is 0, +4, +8, etc.

The user device 212 selectively scans for the broadcast signals 226 (e.g., upon opening the UI application) and receives the broadcast signal 226 from each of the architectural structure coverings 204-210. The user device 212 then determines a signal strength of the received broadcast signal 226 for each of the coverings 204-210 so as to determine proximity thereto. The user device 212, for each broadcast signal 226, measures the power present in the received signal to generate a Received Signal Strength Indicator (RSSI) value. The RSSI value is then smoothed to obtain relative proximity. For example and as illustrated in FIG. 3, the proximity (e.g., $P_1$, $P_2$, $P_3$, and $P_N$) from the user device 212 to each of the coverings 204-210 is based on the smoothed RSSI value.

In the example, the smoothing of the RSSI value is performed over a predefined period of time or number of broadcast signals 226. For example, the RSSI value can be smoothed over a period of time of approximately one second to one and a half seconds. In another example, the RSSI value can be smoothed over approximately ten broadcast signals. It should be appreciated that these time periods and numbers are for example only, and any other predefined values can be used as required or desired. In one example, smoothing of the RSSI value may include averaging at least a portion of the values.

Furthermore, the smoothed RSSI value is also based on the transmit power data that is included in the broadcast signal 226. When signal power is increased, the measured RSSI value is correspondingly reduced so that proximity is determined and based on a single baseline power transmission. For example, if the power of the signal 226 is doubled from a baseline emission, then the measured RSSI value is reduced by half to then smooth and compare with the other signals that are emitted at the baseline power. Alternatively, when signal power is reduced, the measured RSSI value is correspondingly increased. By adjusting the measured RSSI value by the transmit power data, the transmit power of the signal 226 generated or emitted from the coverings can be set as required or desired for a particular edifice 202 and without affecting the proximity determination by the user device 212.

As illustrated in FIG. 2, the user device 212 is in a setup configuration. The setup configuration is when the user or an installer is initially configuring the user device 212 for operational control of the architectural structure coverings 204-210 and further use. Once the user device 212 determines the signal strength of each of the broadcast signals 226, the user device 212 generates an ordered list 222 of the coverings 204-210 based on the information provided by the broadcast signal 226. For example, the ordered list 222 is based on the signal strength of the broadcast signals 226. The ordered list 222 is then at least partially displayed on the display 224 of the user device 212 and the UI.

In the example, during the setup configuration, the ordered list 222 is generated by estimating an initial area grouping 228 of each of the architectural structure coverings 204-210 based on the smoothed RSSI value. This estimation can include grouping (e.g., bucketing or binning) the coverings based on the smoothed RSSI values. For example, the first, second, and third coverings 204-208 have a smoothed RSSI value (and thus proximity $P_1$, $P_2$, and $P_3$) that are similar (e.g., close in value) and are grouped together so that the system 200 estimates that all three coverings are located in the first area 216. The $n^{th}$ covering 210 is in a different grouping and is estimated to be in the $n^{th}$ area 220. Groupings can be based on the smoothed RSSI value differences, frequency, percentiles, ranges, modes, or any other method as required or desired. The initial area grouping 228 can be stored locally on the user device 212 on a local data store (e.g., data store or memory 1004 in FIG. 10). Additionally, for each covering, the RSSI values, the type, and edifice identification number can be locally stored so as to increase the efficiency of the system to maintain the ordered list 222. In an example, the user device 212 stores logic that translates between the RSSI values and proximities. A proximity may be quantitative (e.g., an estimated distance) and/or qualitative (e.g., near, medium, far proximities or some other qualitative estimations). For instance, the logic can include a function that correlates an RSSI value with a proximity. The logic can also or alternatively include a table that stores such correlations. In this way, the user device 212 can group coverings by using the RSSI values and/or by using the logic to estimate the proximities from the RSSI values.

As illustrated, the initial area grouping 228 is displayed on the UI of the user device 212. In other examples, the initial area grouping 228 may be hidden on the UI and not displayed until the initial estimation is verified or edited by the user as described below in reference to FIG. 4. In this example, the ordered list 222 is displayed with names 230 of each of the coverings and ordered by proximity (or RSSI value). The user device 212 may estimate a proximity or an RSSI value of an area. For instance, the proximity may be the average of the quantitative proximity (e.g., average distance or some other statistical measure) or the qualitative proximity of the coverings associated with the area. The RSSI value may be the average (or some other statistical measure) of the RSSI values of the coverings.

The ordered list 222 is ordered by the proximity (or RSSI value) of the initial area groupings 228 to the user device 212 and include names 230 of each of the coverings grouped therein. For example, the ordered list 222 is ordered with the closest proximity (or highest RSSI value) initial area grouping (e.g., the first area 216) displayed prior to further proximity (or lower RSSI value) initial area groupings (e.g., the $n^{th}$ area 220). Additionally, within each initial area grouping 228, the names 230 of the coverings grouped therein are further ordered by proximity (or RSSI value) of the covering to the user device 212. For example, within the first area 216, the second covering 206 is displayed within the UI prior to the first and third coverings 204, 208 because of its proximity to the user device 212. In other examples, the names 230 of the coverings are grouped by covering type so that like coverings are listed together.

In another example, during the setup configuration, the ordered list 222 is generated by ordering the names 230 of each of the architectural structure coverings 204-210 by proximity based on the smoothed RSSI value and then listing the estimated initial area grouping 228. Additionally, the ordered list 222 may be a dynamic list that updates after every generated or emitted broadcast signal 226, or on a periodic time period since data can be locally stored. This allows for the user device 212 to automatically bring the closest proximate initial area grouping or covering to the top of the list 222 as the user device 212 moves about the edifice 202 and maintain the list 222 in substantially real time. In some examples, the smoothed RSSI value is Kalman filtered so as to reduce statistical noise and other inaccuracies and smooth out the dynamic list for the user.

Figure 4:
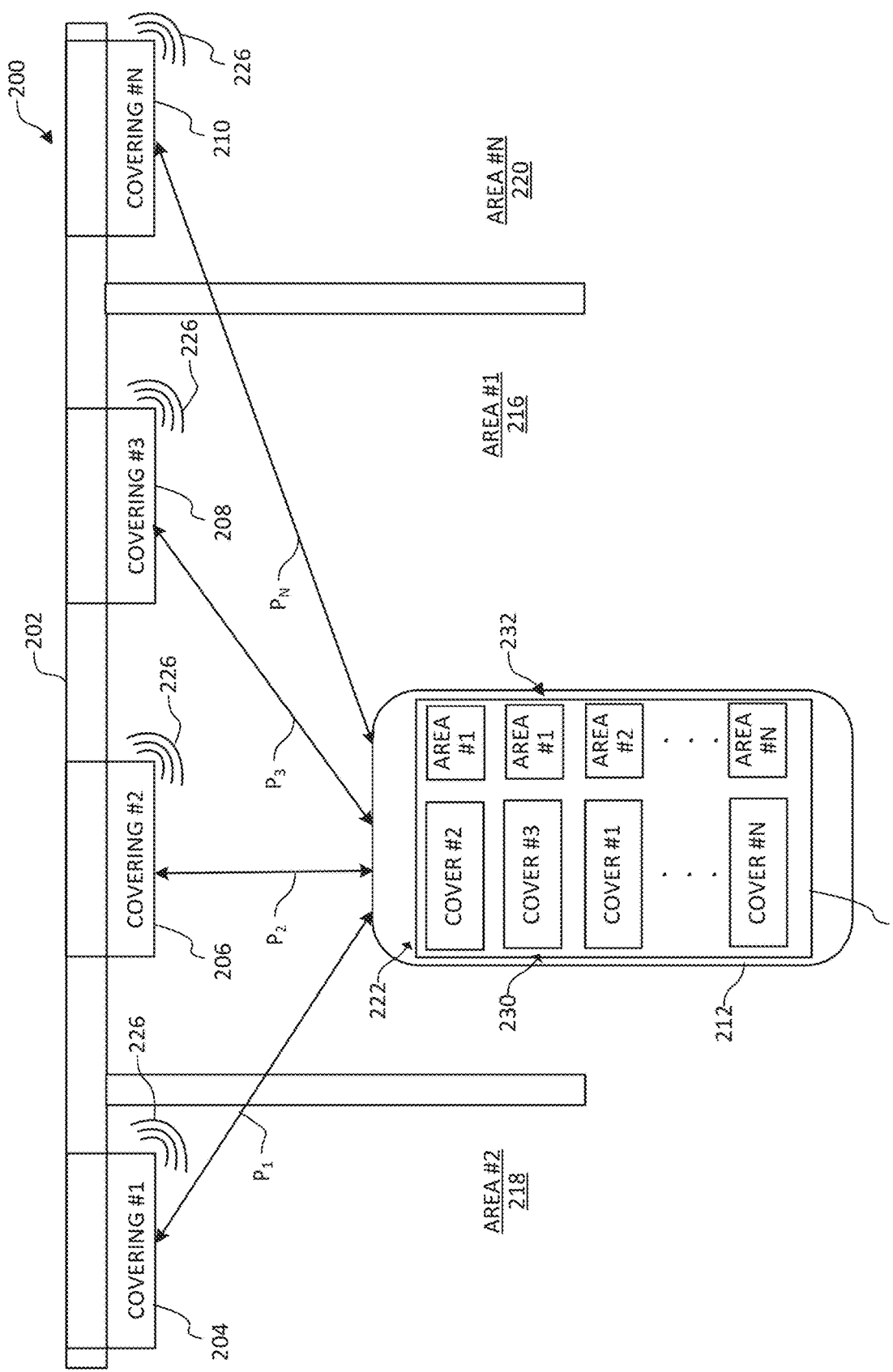
FIG. 4 is a schematic view of the architectural structure covering system in a use-based configuration.

FIG. 4 is a schematic view of the architectural structure covering system 200 in a use-based configuration. Certain components are described above, and thus, are not necessary described further. The use-based configuration is when the user uses the user device 212 for operational control of the architectural structure coverings 204-210. Once the system 200 generates the initial area grouping 228 (shown in FIG. 3), the user revises or edits this initial estimation from the system 200 and within the user interface (UI) in order to provide verification (e.g., user input) for a final area grouping 232 of each of the coverings 204-210. The final area grouping 232 is then used for displaying the ordered list 222 of the coverings on the user device 212 and increase case of use of the system 200 for the user. Information about areas identified in the final grouping can be personalized based on user input via the UI (or via another computing service), such that each area can have a particular identifier, description, image, etc. The final area grouping 232 is stored locally on the user device 212 on a local data store (e.g., data store or memory 1004 in FIG. 10) so that it is accessed by the system 200 (e.g., every time the application is opened by the user device 212). Additionally, for each covering, the RSSI values, estimated proximity, the type, and edifice identification number can be locally stored. In an example, each grouping has a group identifier (ID). The final area grouping 232 can be stored in a data structure (e.g., a table, a matrix, etc.) that includes, for each group, the corresponding group ID in an entry and the corresponding area information and the data about the coverings belonging to the group (e.g., located in the area) in the same entry or in one or more entries associated therewith (e.g., a row in the table corresponds to the group, where a first cell in the row includes the group ID, and remaining cells of the row includes the information about the area and about the grouped coverings). In some examples, some or all of this data is remotely stored on the remote server and tagged with a user identifier. This allows for the settings on the user device 212 to be backed up as required or desired.

In the example, during the use-based configuration, when the user device 212 determines the signal strength of each of the broadcast signals 226, the user device 212 generates and maintains the ordered list 222 of the architectural structure coverings 204-210 based on the signal strength of the signals 226 as described above. The ordered list 222 is then at least partially displayed based on the final area grouping 232. In one example, the system 200 determines a mean or median RSSI value for each of the final groupings 232 based on the coverings disposed therein. The mean or median RSSI value can then be used to determine the list order with the closest area displayed first. In another example, the system 200 determines the closest proximity covering to the user device and then include all of the coverings in that area in the ordered list 222. By using the final area grouping 232, the group that is in the closest proximity based on smoothed RSSI values will be displayed on the ordered list 222 along with the names 230 prior to the further proximity groups.

For example and as illustrated in FIG. 3, the ordered list 222 is ordered with the closest proximity final area grouping (e.g., the first area 216) displayed prior to further proximity final area groupings (e.g., the second and $n^{th}$ areas 218, 220). Additionally, within each final area grouping 232, the names 230 of the coverings grouped therein are further ordered by proximity (e.g., distance) of the covering to the user device 212 and displayed adjacent to one another. For example, within the first area 216, the second covering 206 is displayed prior to the third covering 208 because of its proximity to the user device 212. In this example, it is based on user input that the first covering 204 is placed into the second area 218, and thus displayed after the first area 216. In other examples, the coverings within each area are further grouped by covering type so that like coverings are adjacent to one another as required or desired.

Additionally, the ordered list 222 is a dynamic list that updates after every generated or emitted broadcast signal 226, or on a periodic time period. This allows for the user device 212 to automatically bring the closest proximate final area grouping or covering to the top of the list 222 as the user device 212 moves about the edifice 202 so as to maintain the list 222 in substantially real time. In some examples, the smoothed RSSI value is Kalman filtered so as to reduce statistical noise and other inaccuracies and smooth out the dynamic list for the user. In other examples, the ordered list 222 is dynamically updated with the movement of the user device 212 around the edifice 202.

In the examples described in FIGS. 3 and 4, it is the user device 212 that performs the actions to determine the proximity of the architectural structure coverings 204-210 relative thereto. Additionally or alternatively, the architectural structure coverings 204-210 are used to determine the proximity of the user device 212 relative thereto as required or desired. For example, the coverings are used to ping the user device and/or the user device sends out a broadcast signal from which the covering determines the proximity of the user device 212 thereto.

Figure 5:
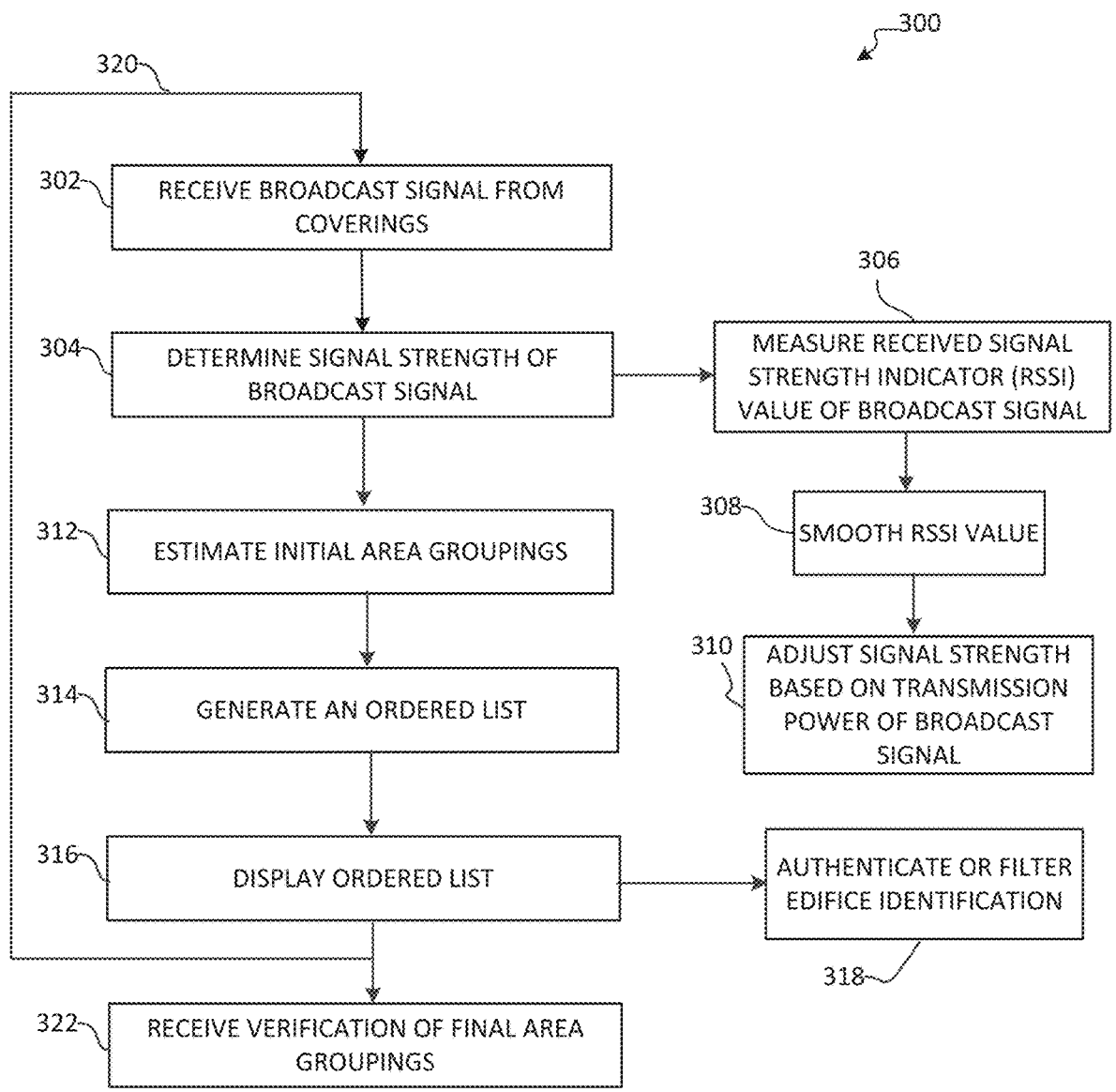
FIG. 5 is a flowchart illustrating an exemplary method for determining proximity of a plurality of architectural structure coverings during a setup configuration.

FIG. 5 is a flowchart illustrating an exemplary method 300 for determining proximity of a plurality of architectural structure coverings during a setup configuration. The method 300 may be performed by a user device, such as the user device 212 (shown in FIGS. 3 and 4). The method 300 begins at operation 302, where the broadcast signals that are generated from each of the architectural structure coverings are received. The broadcast signal may be generated or emitted (e.g., broadcasted) at predetermined and/or periodic time intervals and include informational data, power transmission data, and/or an edifice identification of the respective architectural structure covering such as described herein.

Moving to operation 304, a signal strength of the broadcast signal is determined. In the example, the signal strength corresponds to the proximity of the architectural structure coverings with higher signal strengths relating to closer proximity coverings. In some examples, determining the signal strength (operation 304) may include measuring a Received Signal Strength Indication (RSSI) value of the broadcast signal at operation 306 and smoothing the RSSI value at operation 308. This smoothed RSSI value is used to determine the proximity of the coverings relative to the user device (e.g., by inputting the smoothed RSSI value to logic that is stored on the user device, translates between RSSI values and proximities, and outputs the proximity given the input RSSI value). In some aspects, the signal strength is adjusted based on the power transmission of the broadcast signal at operation 310.

Once the signal strength is determined (operation 304), at operation 312 one or more initial area groupings are estimated based on signal strengths (or proximities), where the initial area groupings correspond to one or more architectural structure coverings that are located in a similar area. Then an ordered list of each of the plurality of architectural structure coverings is generated at operation 314. The ordered list can be based on the proximity (or the smoothed RSSI value) of the coverings and/or the initial area groupings. The user device can also display the ordered list at operation 316. In some examples, during the generation (operation 314) and/or the display (operation 316), the method 300 includes authenticating or filtering an edifice identifier at operation 318 so that only coverings that are associated with the edifice are listed. The ordered list can include a type of each of the covering based on the information data received and the estimated group. This process of determining the proximity of coverings can be repeated after every broadcast signal so that the ordered list is dynamic and constantly updated at operation 320 so that the list is maintained.

During the setup configuration, after the ordered list is displayed (operation 316), the user can provide user input and revise and/or edit the initial area groupings to verify one or more final area groupings in operation 322. This operation 322 can include associating specific coverings to specific area groupings and/or naming the area groupings (e.g., master bedroom, kitchen, etc.). The final area groupings are saved for use in the use-based configuration described below in reference to FIG. 6.

Figure 6:
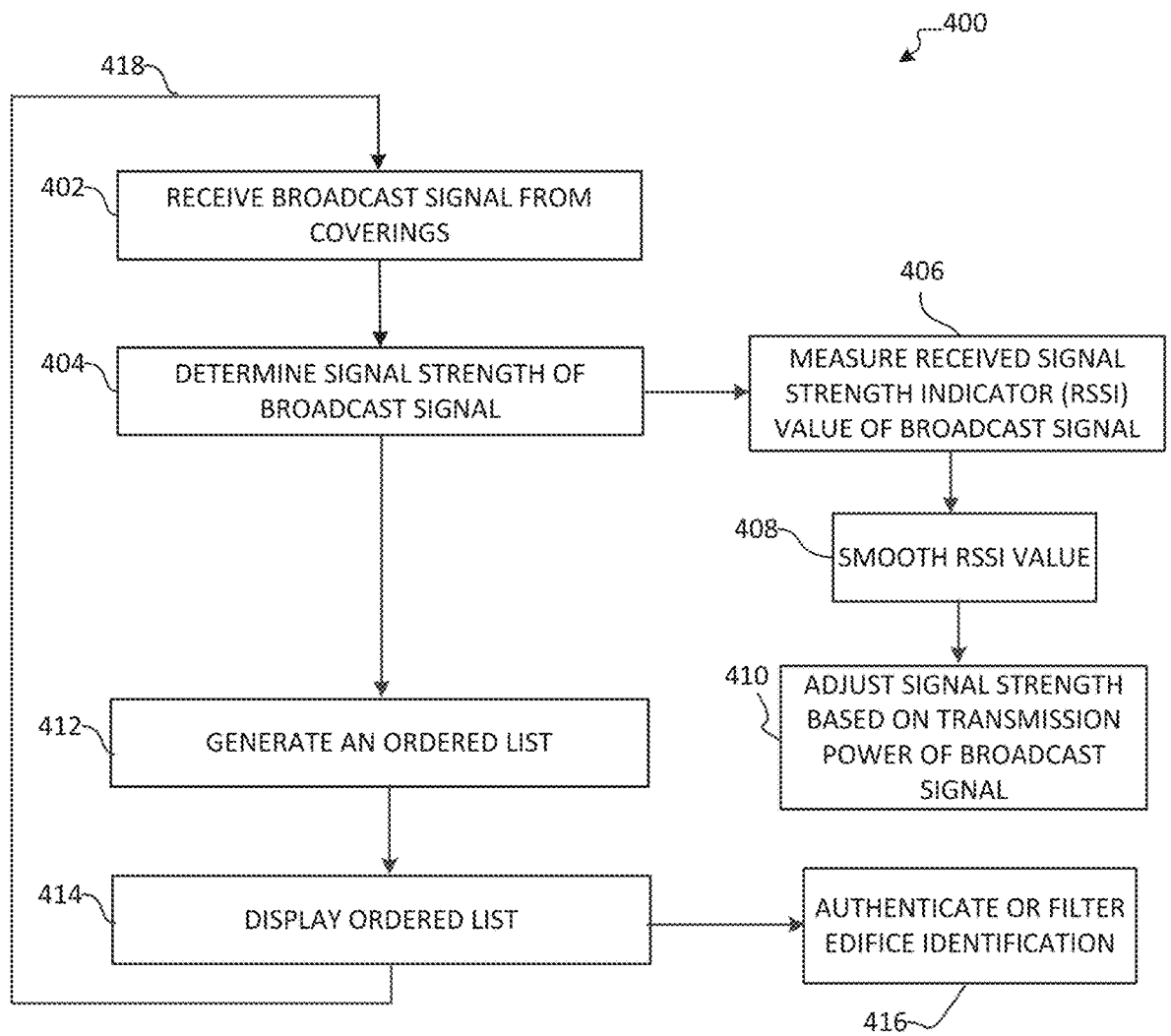
FIG. 6 is a flowchart illustrating an exemplary method for determining proximity of a plurality of architectural structure coverings during a use-based configuration.

FIG. 6 is a flowchart illustrating an exemplary method 400 for determining proximity of a plurality of architectural structure coverings during a use-based configuration. The method 400 may be performed by a user device, such as the user device 212 (shown in FIGS. 3 and 4). The method 400 begins at operation 402, where the broadcast signals that are generated or emitted (e.g. broadcasted) from each of the architectural structure coverings are received. Moving to operation 404, a signal strength of the broadcast signal is determined. In some examples, determining the signal strength (operation 404) may include measuring a Received Signal Strength Indication (RSSI) value of the broadcast signal at operation 406 and smoothing the RSSI value at operation 408. In some aspects, the signal strength is adjusted based on the power transmission of the broadcast signal at operation 410.

Once the signal strength is determined (operation 404), at operation 412 an ordered list of each of the plurality of architectural structure coverings is generated based on the final area groupings that were verified by the user. The ordered list can be based on smoothed RSSI value or the proximity estimated room the smoothed RSSI value of the coverings and/or the final area groupings. The user device can also display the ordered list at operation 414. In some examples, during the generation (operation 412) and/or the display (operation 414), the method 400 includes authenticating or filtering an edifice identifier at operation 416 so that only coverings that are associated with the edifice are listed. Additionally, this process of determining the proximity of coverings can be repeated after every broadcast signal so that the ordered list is dynamic and constantly updated at operation 418 so that the list is maintained.

In an example, once the grouping is generated (initially per the flowchart of FIG. 5 or in a use-based configuration per the flowchart of FIG. 6), one or more of the coverings can be controlled via the user device. In particular, user input for a covering operation can be received via the user interface, Based on the user input, the user device sends one or more instructions to at least one architectural structural covering. The one or more instructions cause the architectural structural covering to perform the operation. For instance, the one or more instructions are sent as a signal that includes one or parameters of the operation. To illustrate, an operation can include changing a position of the covering. The one or more instructions can identify the new position.

Once architectural structure covering groupings are defined, subsequent RSSI values and/or proximities can be used to determine that a user device is located within an area and display information about the area with selectable options to control the architectural structure coverings in the area. In particular, the user device receives and processes broadcast signals of the architectural structure coverings over time by at least filtering, aggregating, sorting, and thresholding their radio signal strengths (e.g., RSSI values). Based on the processing, the user device determines the most likely proximate group of architectural structure coverings and displays, in a user interface, the corresponding area as a current area within which the user device is located (e.g., a "current room"). Selectable operations (e.g., "quick actions") are also displayed in the user interface to facilitate user controls over the architectural structure coverings that belong to the group.

Different constraints can be applied to the processing of the broadcast signals to improve the fidelity of the current area determination. In one example, broadcast signals are monitored over a predefined period of time (e.g., three seconds). Broadcast signals that are received from a same architectural structure covering for a time duration longer than the predefined time period are further processed because they indicate a persistent broadcasting. Otherwise, the broadcast signals are removed. In addition, a Kalman filter can be applied to remove outlier RSSI values and reduce noise. Further, for a coverings group, it may be sufficient to use the broadcast signals of only one of the architectural structure coverings (e.g., the one with the highest RSSI values or the most proximate) to determine the group and the corresponding area. However, a higher degree of accuracy can be gained by processing the broadcast signals of more than one (e.g., of all or a subset of multiple ones) of the group's architectural structure coverings. To do so, the area corresponding to the group is associated with an aggregate RSSI value (or aggregate proximity) derived from the individual RSSI values (or individual proximities) of the multiple architectural structure coverings.

Herein next, examples are described in connection with using RSSI values to determine a current area. However, embodiments of the present disclosure are not limited as such. Instead, each RSSI value can be translated into a proximity, and the proximities can be used to determine the current area. For instance, rather than determining an aggregate RSSI value per area, selecting the area that has the highest aggregate RSSI value, and comparing this aggregate RSSI value to an RSSI threshold, the user device can determine an aggregated proximity per area (e.g., an average distance between the user device and an area, or some other statistical measure of the proximity), select the area that is the most proximate (e.g., has the smallest distance), and compare its aggregated proximity to a proximity threshold.

Figure 7:
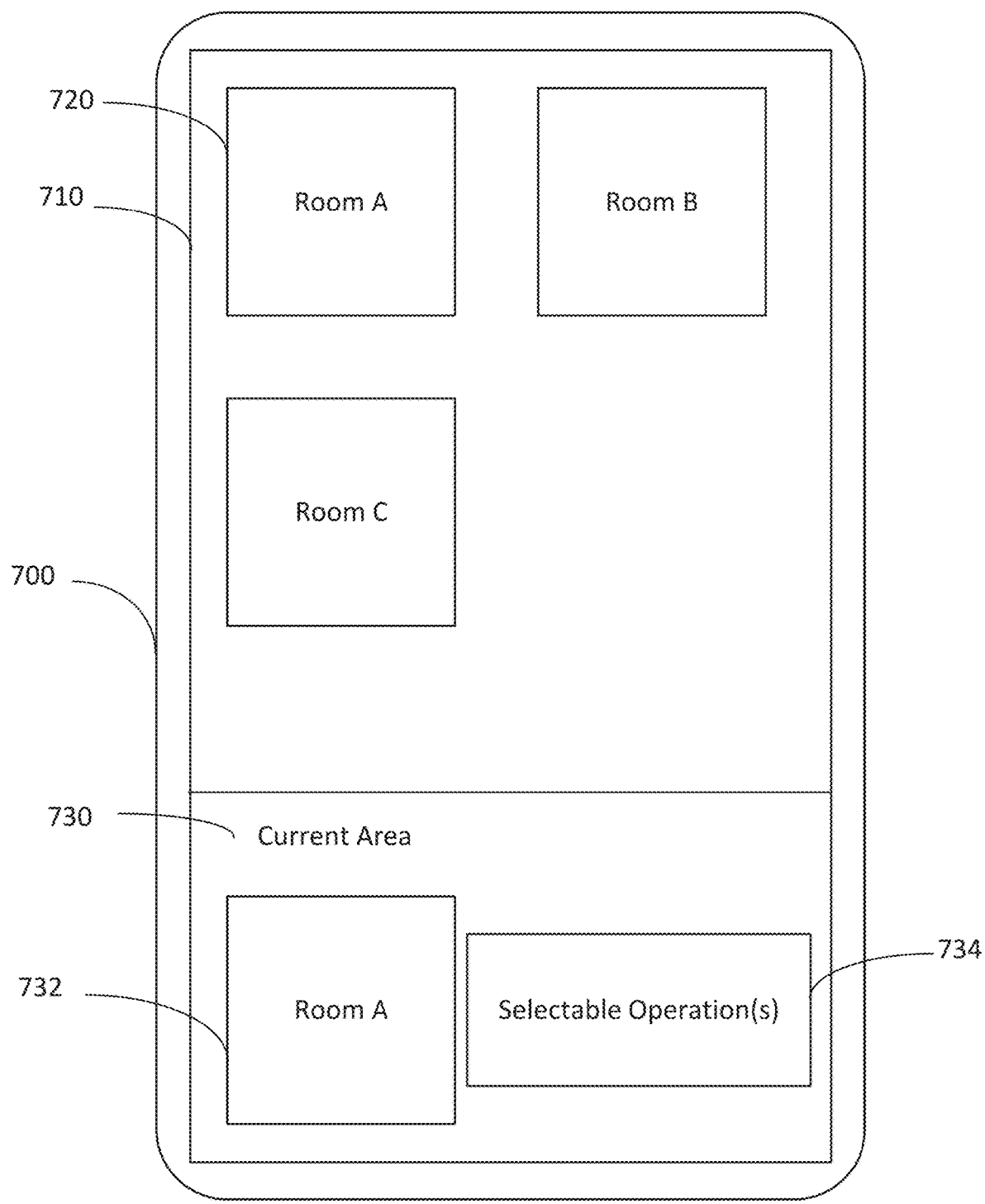
FIG. 7 is an exemplary user interface displaying information about a current area.

FIG. 7 is an exemplary user interface displaying information about a current area. As illustrated, a user device 700 presents a user interface 710 on a display of the user device 700. The user interface 710 displays user interface elements 720 (e.g. selectable icons or tiles) that identify and provide textual and/or graphical information about different areas, each of which corresponds to a group of one or more architectural structure coverings and includes the one or more architectural structure coverings. In the illustration of FIG. 7, three user interface elements 720 are shown ("room A," "room B", and "room C," such as "studio," "kitchen," "living room"), although a different number of user interface elements is possible and generally depends on the number of areas that contain architectural structure coverings. Each of the user interface elements 720 is selectable and, upon selection, results in the user interface 710 identifying the architectural structure coverings included in the selected area and providing selectable operations to control such coverings.

In addition, the user interface 710 displays a current area section 730 that identifies the area in which the user device 700 is estimated to be currently located and that provides options for controlling the architectural structure coverings located in this current area. In an example, the current area section 730 displays a user interface element 732 (e.g. a selectable icon or tile) that identifies and describes the current area (e.g., "room A"). In addition, the current area section 730 displays one or more other user interface elements 734. Each user interface element 734 identifies one or more selectable operations (e.g., open, close, stop, add current area to favorite, and/or other quick actions) that, upon selection, trigger the user device 700 to, as applicable, perform the operation(s) (e.g., add to favorite) and/or send one or more instructions about the operation(s) to the architectural structure coverings (e.g., open, close, stop), thereby causing such coverings to perform the operation(s).

In an example, a user device, such as the user device 700, receives a broadcast signal transmitted by an architectural structure covering that is located in an area. The broadcast signal includes an identifier (ID) of the architectural structure covering (e.g., the name and/or the type of the architectural structure covering from the informational data about this covering). The user device can use the ID in a look-up of a data store that contains information about groups of architectural structure coverings (e.g., a data structure that associates each group ID, with information about area, and information about any architectural structure coverings belonging to the group and located in the area). Based on the look-up, the user device can determine the group to which the architectural structure covering belongs and the corresponding area. Accordingly, based on broadcast signals and the stored information about the groupings, the user device becomes capable of determining a likely area in which the user device is currently located.

In most situations, an edifice includes multiple areas and each area includes one or more coverings. A user device can be mobile and, thus, can be relocated by an operator between the areas as the operator travels through the edifice. Due to this environment, the user device can receive, in real time, multiple broadcast signals from multiple architectural coverings, where these coverings may belong to different areas. Based on the received broadcast signals and the information about the groupings, the user device can determine the area within which the user device is currently located and display in a user interface this current area, as shown in FIG. 7. The determination can rely on RSSI values of the received broadcast signals (or, as explained herein above, on proximities derived from the RSSI values). In particular, the RSSI values are processed, based on the covering information from the broadcast signals and the information about the groupings, to generate an aggregate RSSI value per area. The area that has the highest smoothed average aggregate RSSI value is determined to be the area that is most proximate to the user device and, accordingly, the most likely current area. If its aggregate value is larger than a predefined or user configured RSSI value threshold, this area is set as the current area and identified on the user interface, along with possible selectable operations.

Figure 8:
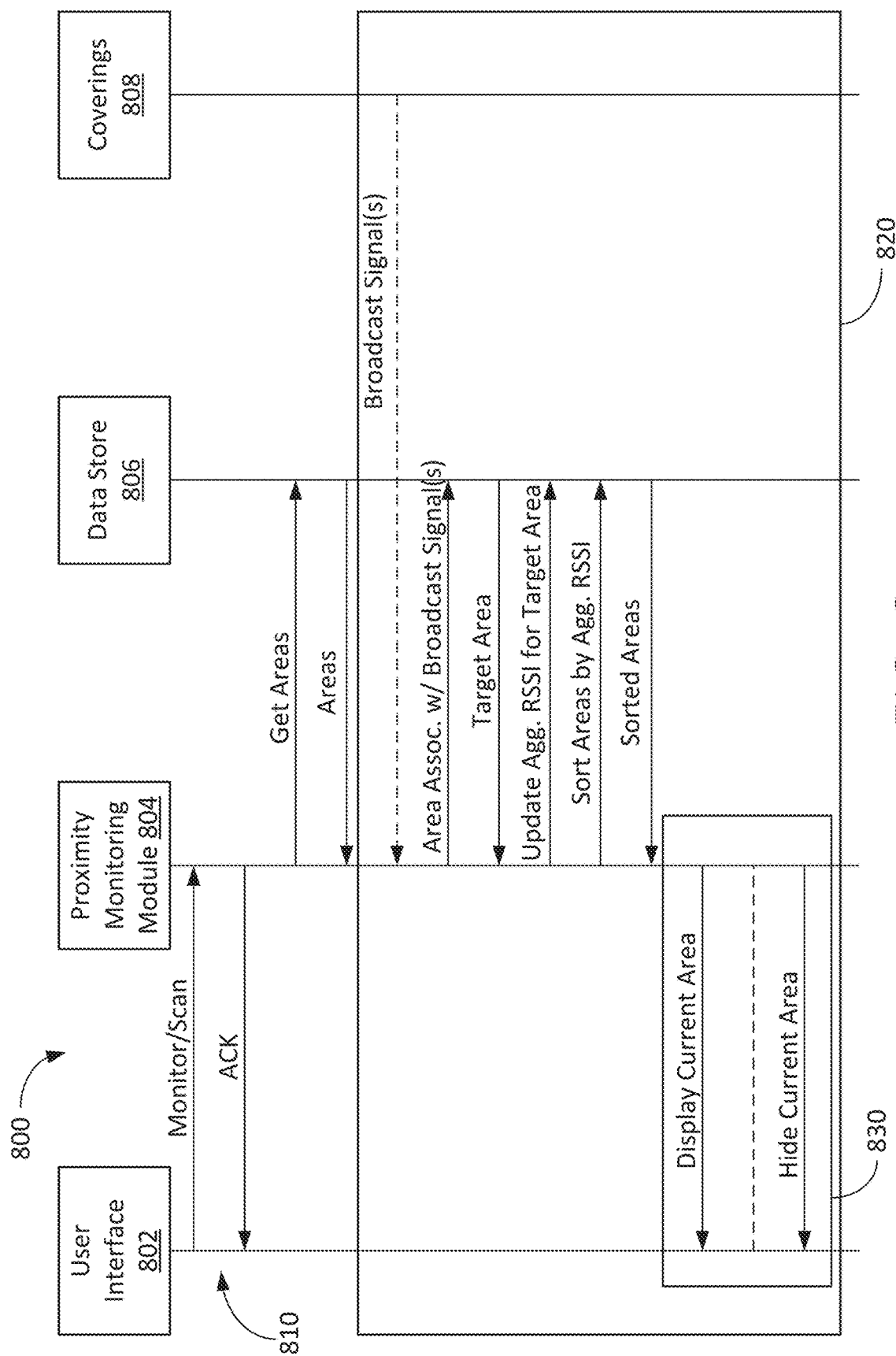
FIG. 8 is a sequence diagram illustrating exemplary steps between computing components for determining a current area based on broadcast signals and information about groups of architectural structure coverings.

FIG. 8 is a sequence diagram 800 illustrating exemplary steps between computing components for determining a current area based on broadcast signals and information about groups of architectural structure coverings. The computing components include a user interface 802 of a user device, proximity monitoring module 804 of the user device, a data store 806 local to the user device or remote and accessible to the user device over a data network, and architectural structure coverings 808. In an example, the sequence diagram 800 includes multiple phases. In a first phase 810, a trigger is determined to initiate the determination of a current area. In a second phase 820, broadcast signals are received and processed to determine possible areas, referred to as target areas. In a third phase 830, the most likely area containing the user device is identified as the current area, if any. The third phase 830 can be included in the second phase 820, and steps of the second phase 820 can be performed in a loop manner over time and across different architectural structure coverings.

As illustrated, in the first phase 810, user input is received via the user interface 802 to determine the current area. For instance, the user input can correspond to a launch of an application on the user device, a selection of a home button of the application, or a selection of a particular option (e.g., one for showing the areas), where the application is configured to provide user controls over the architectural structure coverings 808. In turn, a monitor or scan request is sent to the proximity monitoring module 804 that responds with an acknowledgement (ACK) of this request. Next, the proximity monitoring module 804 performs a look up of the data store 806 (e.g., by using a user ID) requesting an identification of the different areas (shown as "get areas"). In response, the data store 806 sends results that identify the areas (e.g., by including area IDs and the IDs of the architectural structure coverings associated with each area). Although the trigger is illustrated herein as a user input via the user interface 802, other triggers are possible. For instance, speech input can be received by the user device. The same application, another application, or a process of the operating system of the user device can perform natural language processing and understanding to generate a trigger command that is then received by the proximity monitoring module 804. In yet another illustration, the trigger is predefined as a time interval. For instance, the user device periodically (e.g., at a rate corresponding to the predefined time interval) monitors broadcast signals and associated areas.

In the second phase 820, the proximity monitoring module 804 receives broadcast signals from the architectural structure coverings. A broadcast signal can be transmitted from an architectural structure covering using a packet transmission protocol and includes packets. In particular, the packets are transmitted at a predefined rate, such as eight packets per second. Each packet can include an identifier of the architectural structure covering (referred to herein as a covering ID). Upon receipt of a packet, the proximity monitoring module 804 can generate a timestamp of when the packet was received, determine the covering ID from the packet, and determine an RSSI value of the received signal. Packets that include the same covering ID are determined to have been broadcasted by the same architectural structure covering. A Kalman filter can be applied to the RSSI values to remove outliers. Further, the proximity monitoring module 804 determines if broadcast signals transmitted by an architectural structure covering persist for a time duration longer than a predefined time period based on the timestamps (e.g., at least twenty-four packets that include the same covering ID are received during the time duration), these broadcast signals are further processed by the proximity monitoring module 804. The processing may include using RSSI values that have not been filtered out by the Kalman filter.

Next, for each covering ID, the proximity monitoring module 804 performs a look up of the data store 806 (e.g., by using the covering ID in a query) requesting an identification of the area that contains the corresponding architectural structure covering. In response, the data store 806 sends results that identify the areas (e.g., by including area IDs and covering IDs of the architectural structure coverings per target area). The proximity monitoring module 804 determines that these areas are target areas (e.g., likely or candidate areas which which the user device can be located).

The proximity monitoring module 804 updates, for each of the target area, an aggregate RSSI value. In particular, the covering IDs of the architectural structure coverings that are located within an area are determined. The RSSI values of the broadcast signals received from each of the architectural structure coverings during the time period and not filtered out are determined. A mean (or some other statistical measure) of these RSSI values is computed and set as the aggregate RSSI value of the target area. The proximity monitoring module 804 stores and maintains the aggregate RSSI value per target area in the data store 806. To illustrate, consider an example area that contains two architectural structure covering. In the three seconds time period, twenty RSSI values are determined for the first architectural structure covering and twenty-two RSSI values are determined for the second architecture covering. The aggregate RSSI value of this area can be the sum of the twenty RSSI values and the twenty-RSSI values divided by forty-two. Of course, other statistical measures to determine the aggregate RSSI value are possible.

Further, the proximity monitoring module 804 can look up the data store 806 to sort the target areas and, in response, the data store 806 can return a list of sorted areas. The sorted areas are targeted areas that are ordered in a descending manner according to their aggregate RSSI values (e.g., the target area having the highest aggregate RSSI value is identified first, followed by the identifier of the target area having the next highest aggregate RSSI value, and so on). The list can also indicate the aggregate RSSI value per target area.

In the third phase, the proximity monitoring module 804 determines the target area that is the most proximate to the user device (e.g., the target areas that is sorted first in the list). Further, the proximity monitoring module 804 compares the aggregate RSSI value of this target area with an RSSI threshold. Depending on a result of the comparison, the proximity monitoring module 804 instructs the user interface 802 to present or hide a section about the current area. In particular, if the aggregate RSSI value is larger than the threshold, the target area is determined as the current area. Accordingly, the user interface 802 presents a section that identifies the current area (e.g., that includes the name of the current area in a user interface element) and selectable operations that can be performed. Otherwise, the user interface 802 may hide (e.g., not present) this section because no current area is determined.

Figure 9:
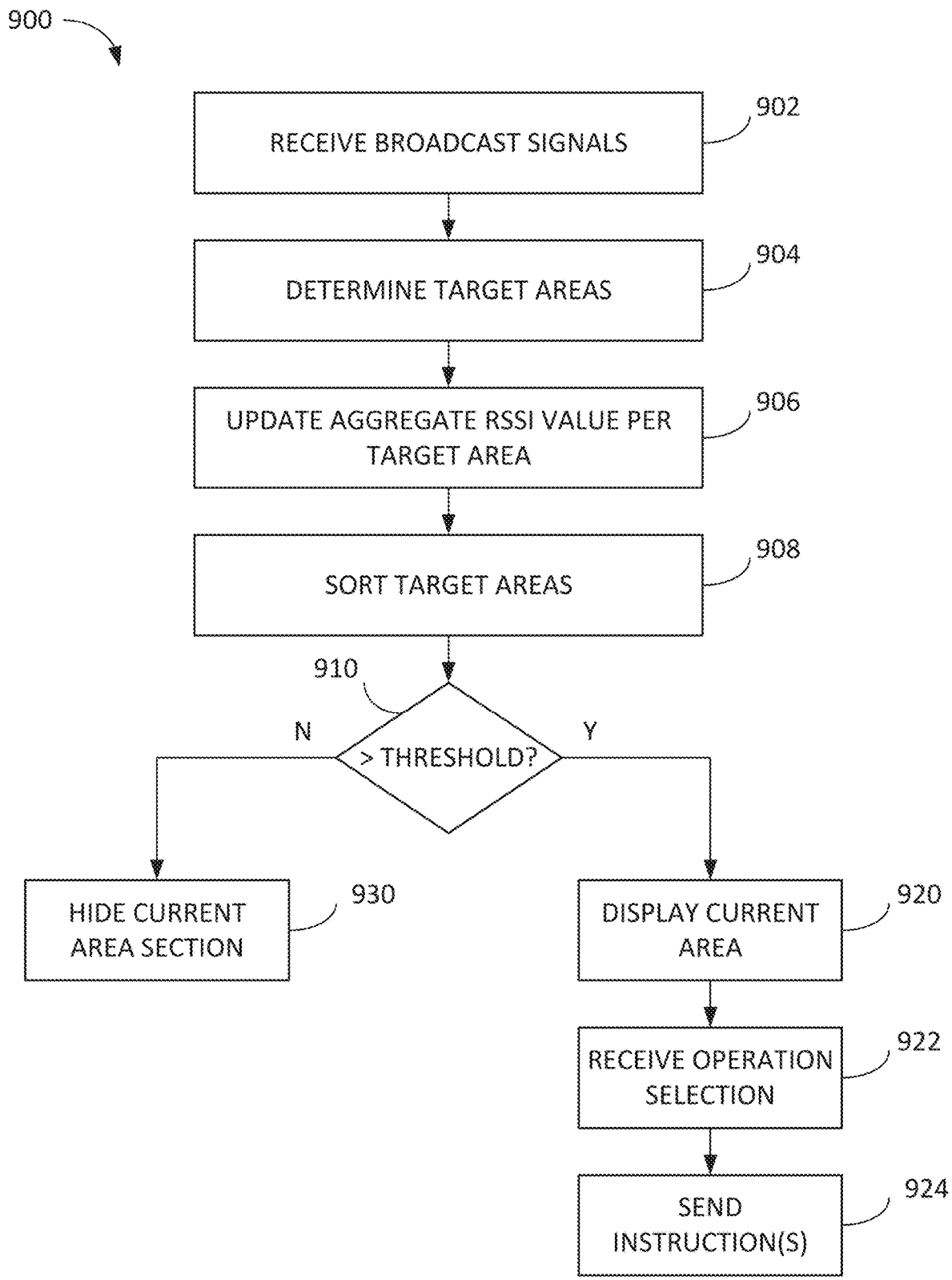
FIG. 9 is a flowchart illustrating an exemplary method for determining a current area based on broadcast signals and information about groups of architectural structure coverings and for controlling one or more of architectural structure covering located in the area.

FIG. 9 is a flowchart illustrating an exemplary method 900 for determining a current area based on broadcast signals and information about groups of architectural structure coverings and for controlling one or more of architectural structure covering located in the area. The method can be implemented on a user device that includes, for instance, the user interface 802, the proximity monitoring module 804, and optionally the data store 806.

In an example, the method 900 starts at operation 902, where the user device receives broadcast signals. Each broadcast signal is transmitted by an architectural structure covering and indicates informational about the architectural structure covering. Operation 902 can be triggered via user input at a user interface of an application executing on the user device requesting and configured to control the architectural structure covering, via speech input detected by the application, another application executing on the user device, or an operating system of the user device, or based on a predetermined interval or schedule to monitor the broadcast signals.

At operation 904, the user device determines target areas. For instance, RSSI values are determined from the received broadcast signals and a Kalman filter is applied thereto to remove outliers. Next, the user device determines whether broadcast signals received from an architectural structure covering persist longer than a predefined time period (e.g., packets that include the covering ID and that are broadcasted at a predetermined rate are received during a time duration longer than three seconds). If persistent, the broadcast signals of this covering are further processed. From persistent broadcast signals, the user device determines covering IDs and performs a look up of a data structure that identifies target areas, each of which is associated with a covering ID.

At operation 906, the user device updates an aggregate RSSI value per target area. For instance, for each target area, the user device determines, from the data structure, the coverings IDs that are located in the area. RSSI values of broadcast signals that include these covering IDs are determined. A mean (or some other statistical measure) of these RSSI values is computed and corresponds to the aggregate RSSI value of the target area.

At operation 908, the user device sorts the target areas. For instance, the target areas are sorted in a descending order based on their aggregate RSSI values.

At operation 910, the user device compares the largest aggregate RSSI value to an RSSI threshold. If larger than the RSSI threshold, the method 900 proceeds to operation 920. Otherwise, the method 900 proceeds to operation 930.

At operation 920, the user device displays the current area. For instance, the user device determines that the current area is the target area that has the largest aggregate RSSI value. Informational data about this area, including for instance, its name, description, image, etc. and, optionally, information data about the architectural structure coverings are received from the data structure. Any or all of the informational data can be displayed in user interface elements in a current area section of the user interface. In addition, the user interface can include selectable operations that can be performed by the architectural structure coverings located in the current area.

At operation 922, the user device receives an operation selection. For instance, user input is received via the user interface and selects a displayed selectable operation. Additionally or alternatively, speech input is received by the user device and corresponds to a selection of displayed selectable operation or, more generally, to an operation that is supported by architectural structure coverings.

At operation 924, the user device sends one or more instructions to the architectural structure coverings about the selected operation. For instance, the user device determines the architectural structure coverings that belong to the group corresponding to the current area and instructs these coverings to close, open, stop.

At operation 930, no current area was determined. Accordingly, the user device may not present information about such an area by hiding the current area section in the user interface.

Figure 10:
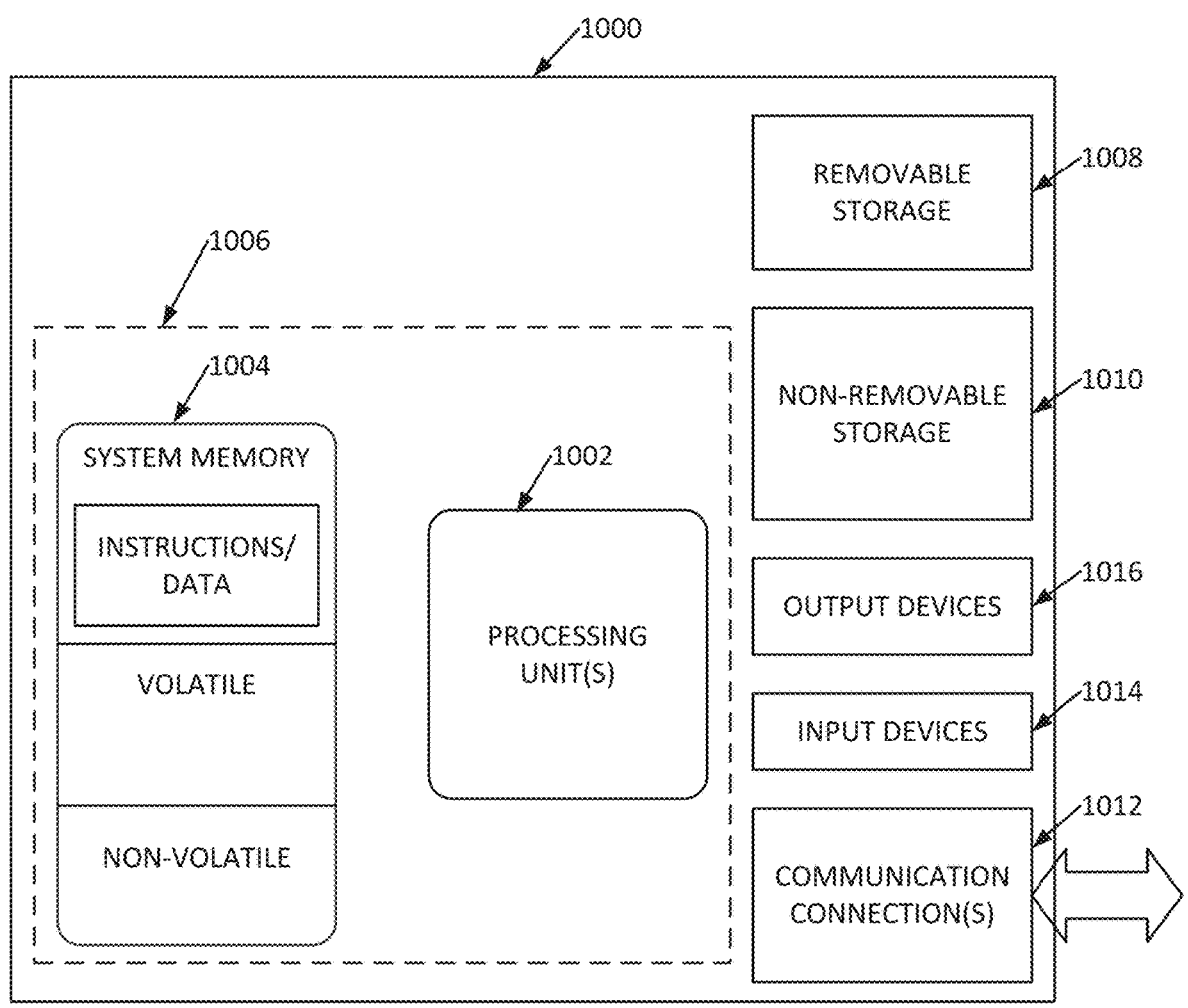
FIG. 10 is a block diagram of an exemplary operating environment in which one or more of the present examples may be implemented.

FIG. 10 is a block diagram of an exemplary operating environment 1000 in which one or more of the present examples may be implemented. For example, the architectural structure covering controller 142 (shown in FIG. 2) and/or the user device 212 (shown in FIGS. 3 and 4). This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 1000 typically includes at least one processing unit 1002 and memory 1004. Depending on the exact configuration and type of computing device, memory 1004 (instructions to perform the computer vision robot control operations disclosed herein) may be volatile (such as RAM), non-volatile (such as ROM, flash memory, etc.), or some combination of the two. This most basic configuration is illustrated in FIG. 10 by dashed line 1006. Further, environment 1000 also includes storage devices (removable 1008 and/or non-removable 1010) including, but not limited to, magnetic or optical disks or tape. Similarly, environment 1000 may also have input device(s) 1014 such as keyboard, mouse, pen, voice input, etc. and/or output device(s) 1016 such as a display, speakers, printer, etc. Also included in the environment 1000 are one or more communication connections 1012, such as LAN, WAN, point to point, etc.

Operating environment 1000 typically includes at least some form of computer readable media. Computer readable media can be any available media that can be accessed by processing unit 1002 or other devices including the operating environment. By way of example, and not limitation, computer readable media may include computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer readable media.

The operating environment 1000 may be a single computer operating in a networked environment using logical connections to one or more remote computers. The remote computer may be a personal computer, a server, a router, a network PC, a peer device, or other common network node, and typically includes many or all of the elements described above as well as others not so mentioned. The logical connections may include any method supported by available communications media. Such networking environments are commonplace in offices, enterprise-wide computer networks, intranets, and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently, or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general concepts embodied in this application that do not depart from the broader scope of the disclosure.

What is claimed is:

1. A device comprising:
one or more processors; and
one or more memories storing instructions, that upon execution by the one or more processors, configure the device to:
transmit a first signal to a plurality of architectural structure coverings, wherein a first architectural structure covering of the plurality of architectural structure coverings includes a mechanically movable material;
receive, from the first architectural structure covering, a second signal indicating a proximity of the first architectural structure covering;
maintain an ordered list of the plurality of the architectural structure coverings based on the second signal; and
display at least a portion of the ordered list on a display of the device, the portion indicating the first architectural structure covering in an order that is based on at least one of: architectural structure covering proximities, architectural structure covering types, or architectural structure covering installation areas.

2. The device of claim 1, wherein the one or more memory further store computer executable instructions that, when executed by the one or more processors, further configure the device to:
estimate an initial area grouping for the first architectural structure covering based on the second signal indicating the proximity received from the first architectural structure covering.

3. The device of claim 2, wherein the one or more memory further store computer executable instructions that, when executed by the one or more processors, further configure the device to:
receive a verification for a final area grouping for the first architectural structure covering based on user input; and
upon displaying the portion of the ordered list, display multiple architectural structure coverings in the final area grouping adjacent to one another.

4. The device of claim 1, wherein the second signal indicating the proximity received from the first architectural structure covering comprises informational data of the first architectural structure covering and an edifice identification.

5. The device of claim 1, wherein the first signal is a broadcast signal transmitted at periodic time intervals, and wherein the second signal is generated by the first architectural structure covering after determining a signal strength of the first signal and is at least partially based on a smoothing of a Received Signal Strength Indicator (RSSI) measurement.

6. The device of claim 1, wherein the second signal is repeatedly received at periodic time intervals.

7. The device of claim 6, wherein the one or more memory further store computer executable instructions that, when executed by the one or more processors, further configure the device to:
update the ordered list after a number of received second signals such that the ordered list is dynamic.

8. A method implemented by a user device and comprising:
transmitting a first signal to a plurality of architectural structure coverings, wherein a first architectural structure covering of the plurality of architectural structure coverings includes a mechanically movable material;
receiving a second signal from the first architectural structure covering indicating a first proximity and a third signal from a second architectural structure covering indicating a second proximity;
maintaining an ordered list of the plurality of the architectural structure coverings based on the first proximity and the second proximity; and
displaying at least a portion of the ordered list on a user interface of a display of the user device, the portion indicating the first architectural structure covering and the second architectural structure covering in an order that is based on at least one of: architectural structure covering proximities, architectural structure covering types, or architectural structure covering installation areas.

9. The method of claim 8 further comprising:
receiving, via the user interface, user input for an operation of the first architectural structure covering; and sending, based on the user input, one or more instructions to the first architectural structure covering, the one or more instructions causing the first architectural structure covering to perform the operation.

10. The method of claim 8, wherein the ordered list includes informational data about the first architectural structure covering based on the first proximity determined based on a signal strength of the first signal.

11. The method of claim 8, wherein the second signal indicates informational data about the first architectural structure covering, and wherein the method further comprises:
determining, based on the second signal and the third signal, a group of architectural structure coverings, wherein the ordered list indicates the group;
determining the informational data from the second signal; and
storing, in a data structure, the informational data and an association of the first architectural structure covering to the group.

12. The method of claim 11 further comprising:
adding, based on the first proximity and the second proximity, second informational data about the second architectural structure covering to the group.

13. The method of claim 12, wherein the group corresponds to an area, and wherein the method further comprises:
indicating in the ordered list that (i) the first architectural structure covering and the second architectural structure covering belong to the area, (ii) the first architectural structure covering is closer to the user device than the second architectural structure covering based on the first proximity being smaller than the second proximity.

14. The method of claim 11, wherein the group corresponds to an area, and wherein the method further comprises:
receiving a fourth signal from the first architectural structure covering;
determining an identifier of the first architectural structure covering based on the fourth signal;
identifying the group from a plurality of groups based on the identifier;
determining that the user device is in the area based on the group being identified; and
displaying, on the user interface, an indication that the user device is located in the area.

15. The method of claim 14 further comprising:
displaying, on the user interface, a control element selectable to request one or more operations of architectural structure coverings that belong to the group.

16. The method of claim 11, wherein the group corresponds to an area, and wherein the method further comprises:
receiving user input for a covering operation;
determining that the covering operation is applicable only to the group based on the user device being in the area; and
sending one or more instructions to the first architectural structure covering based on the first architectural structure covering belonging to the group, the one or more instructions requesting the covering operation.

17. The method of claim 16, wherein the user input is speech input that is received via a microphone of the user device and that requests the covering operation without identifying any of the area, the group, or the first architectural structure covering.

18. An architectural structure covering system comprising:
a plurality of architectural structure coverings, wherein each of the plurality of architectural structure coverings includes a mechanically movable material and is configured to generate a first signal indicating a proximity to a user device;
the user device configured to:
transmit a second signal to the plurality of architectural structure coverings;
receive the first signal from each of the plurality of architectural structure coverings;
maintain an ordered list of the plurality of the architectural structure coverings based on the received first signals; and
display at least a portion of the ordered list on a display, the portion indicating the plurality of the architectural structure coverings in an order that is based on at least one of: architectural structure covering proximities, architectural structure covering types, or architectural structure covering installation areas.

19. The architectural structure covering system of claim 18, wherein the ordered list is based on the proximity received from the plurality of the architectural structure coverings, and wherein the proximity indicates a distance relative to the user device.

20. The architectural structure covering system of claim 18, wherein each of the plurality of architectural structure coverings is configured to:
receive the second signal from the user device;
determine a signal strength of the second signal;
estimate, based on the signal strength of the second signal, the proximity of the user device to a first architectural structure covering included in the plurality of the architectural structure coverings; and
transmit the first signal to the user device.

* * * * *